United States Patent [19]

Bodig et al.

[11] 4,448,180

[45] May 15, 1984

[54] IGNITION SYSTEM FOR AN INTERNAL COMBUSTION ENGINE

[75] Inventors: Bernd Bodig, Leinfelden-Echterdingen; Gerd Höhne, Ludwigsburg; Bernd Kalkhof, Reutlingen, all of Fed. Rep. of Germany

[73] Assignee: Robert Bosch GmbH, Fed. Rep. of Germany

[21] Appl. No.: 433,957

[22] Filed: Oct. 13, 1982

[30] Foreign Application Priority Data

Apr. 28, 1982 [DE] Fed. Rep. of Germany ....... 3215728

[51] Int. Cl.$^3$ ............................ F02P 9/00; F02P 3/04
[52] U.S. Cl. .................................... 123/618; 123/630
[58] Field of Search ................ 123/618, 630, 179 BG, 123/406, 179 G, 179 R, 179 B; 310/70 R, 153

[56] References Cited

U.S. PATENT DOCUMENTS

| | | | |
|---|---|---|---|
| 4,137,885 | 2/1979 | Van Ostrom | 123/179 BG |
| 4,202,304 | 5/1980 | Jundt et al. | 123/618 |
| 4,217,874 | 8/1980 | Sobner et al. | 123/618 |
| 4,265,204 | 5/1981 | Jundt et al. | 123/406 |
| 4,271,812 | 6/1981 | Bodig et al. | 123/618 |
| 4,351,310 | 9/1982 | Adler et al. | 123/630 |
| 4,356,808 | 11/1982 | Bodig et al. | 123/618 |
| 4,391,262 | 7/1983 | Schleupen | 123/618 |

*Primary Examiner*—Raymond A. Nelli
*Attorney, Agent, or Firm*—Frishauf, Holtz, Goodman & Woodward

[57] ABSTRACT

A timing wave generator 26 provides the same input to two threshold switches that switch on at approximately the same time but have different switching hysteresis. The switch with the smaller hysteresis can affect ignition timing only through a delay circuit while the other can do so directly. If the engine stalls the delay circuit will assure that the primary current is shut off in a short time. In normal operation the large hysteresis of one of the threshold switches is in control and provides insensitivity to disturbance, but during startup the characteristics of the delay circuit can provide the appropriate ignition timing.

3 Claims, 2 Drawing Figures

IGNITION SYSTEM FOR AN INTERNAL COMBUSTION ENGINE

This invention concerns an engine ignition system of the kind utilizing a d.c. voltage source for providing power through an enabling switch for the system, an engine-driven a.c. generator for providing a timing wave, an ignition coil having a primary and a secondary winding, an electronic interruptor switch in circuit with the primary winding and the d.c. voltage source, and means responsive to the timing wave of the a.c. generator for timing the closing and opening of the interruptor switch.

More particularly the invention concerns an ignition system of the general type disclosed in U.S. Pat. No. 4,071,792, in which the means just mentioned for timing the closing and opening of the interruptor switch include a threshold switch having its input connected to the output of the a.c. generator. In the system there disclosed, the switch-on voltage and the switch-off voltage of the threshold switch have the same polarity with reference to the null transition of the a.c. voltage timing wave. When the enabling switch of the system is on but the engine is not yet put into operation, no current flows through the primary winding in such a case, and overheating of the ignition coil is avoided, but in that system it can happen that the engine will not start or will start only with difficulty because at first the rate of fall of the a.c. voltage following its peak value has a very small slope and in consequence the ignition moment is relatively far advanced with reference to the upper dead point of the piston of the engine.

THE INVENTION

It is an object of the present invention to eliminate the starting difficulties just mentioned in an ignition system that has the advantage of the system just described, namely that overheating of the ignition coil is prevented when the engine is stopped with the ignition switch turned on.

Briefly, a second threshold switch responsive to the a.c. generator timing wave and having its input in shunt with the input of the first threshold switch is provided which operates to control the interruptor switch through a delay circuit. The thresholds of the first and second threshold switch are set so that in normal operation the switchover of the interruptor switch into its nonconducting condition is produced in response to the first threshold switch, while in other cases such switchover is produced in response to the delay circuit before the corresponding operation of the first threshold switch takes place, and with reference to the null transition of the a.c. timing wave, the switch-on and switch-off thresholds of the first threshold switch are of opposite polarities, whereas the corresponding threshold of the second threshold switch are of the polarity as the switch-on threshold of the first threshold switch.

It is particularly advantageous for the switch-off threshold of the first threshold switch to be set so that the operation of putting the engine into motion from a rest condition can be completed before that threshold comes into operation for spark timing control.

THE DRAWINGS

The invention is further described by way of illustrative example with reference to the annexed drawings, in which:

FIG. 1 is a circuit diagram of an ignition system according to the invention, and FIG. 2 is a graph of the a.c. voltage waves of the timing generator by which the functioning of the circuit of FIG. 1 may be explained.

DESCRIPTION OF THE ILLUSTRATED EMBODIMENTS

Figure 1:
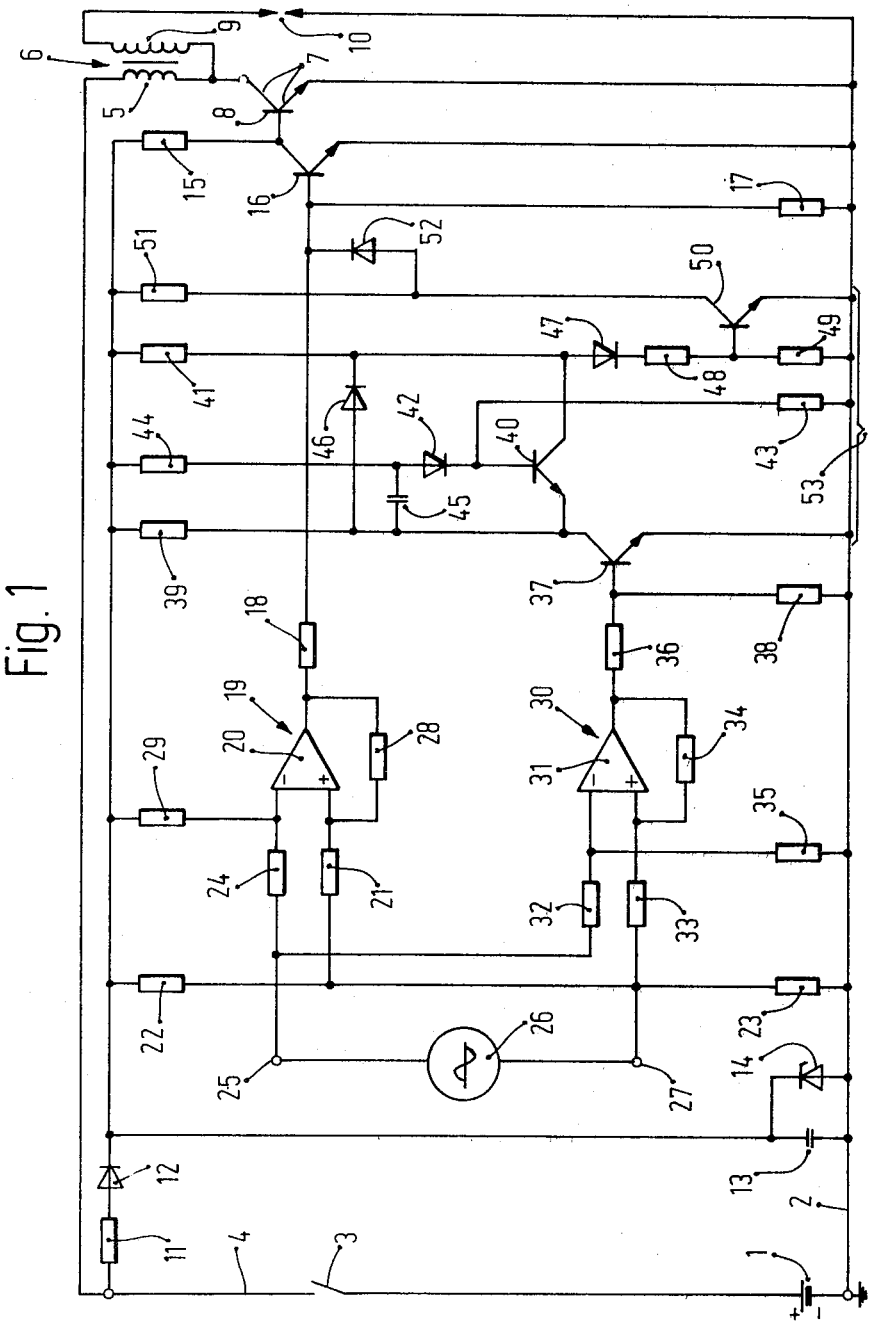

The circuit of FIG. 1 is an ignition system for an internal combustion engine (not shown) of a motor vehicle. This ignition system is supplied with power from a d.c. voltage source 1 representing the storage battery of the motor vehicle.

A ground bus 2 is connected to the negative pole of the d.c. source 1 and the positive pole of the latter is connected to a voltage supply bus 4 through an ignition switch 3 which must be turned on to enable the system to operate.

From the positive voltage bus 4 a circuit branch proceeds first over the primary winding 5 of an ignition coil 6 and then through the switching path of an interruptor switch 7, over to the ground bus 2 which as usual is grounded to the chassis of the vehicle. The switching path of the electronic interruptor 7 is constituted by the emitter-collector path of an npn transistor 8, of which the emitter is connected to the ground bus 2.

Another circuit branch connected between the supply bus 4 and the ground bus 2 proceeds from the former over a current limiting resistor 11, then through a diode 12 which serves for protection against connection of the battery in false polarity, and finally through a buffer capacitor 13, the latter being connected to the cathode of the diode 12 and being shunted by a Zener diode 14 which has its anode connected to the ground bus 2.

The cathode of the protective diode 12 is also connected through a resistor 15 to the collector of an npn transistor 16 and, furthermore, connected at the same time to the base of the transistor 8. The transistor 16 has its emitter connected directly to the ground bus 2 and its base connected thereto through a resistor 17. The base of the transistor 16 is also connected through a resistor 18 to the output of a first threshold switch 19 which is constituted by an operational amplifier 20.

The operational amplifier 20 has its noninverting input connected through a resistor 21 to the connection point of two resistors 22 and 23 which provide a voltage divider connected between the cathode of the diode 12 and the ground bus 2 and make available at their common connection a potential that corresponds to about half of the voltage of the d.c. voltage source 1.

The inverting input of the operational amplifier 20 is connected through a resistor 24 to the connection terminal 25 of an a.c. generator 26 which has another of its terminals, designated 27, connected to the connection point of the resistors 22 and 23.

Figure 2:
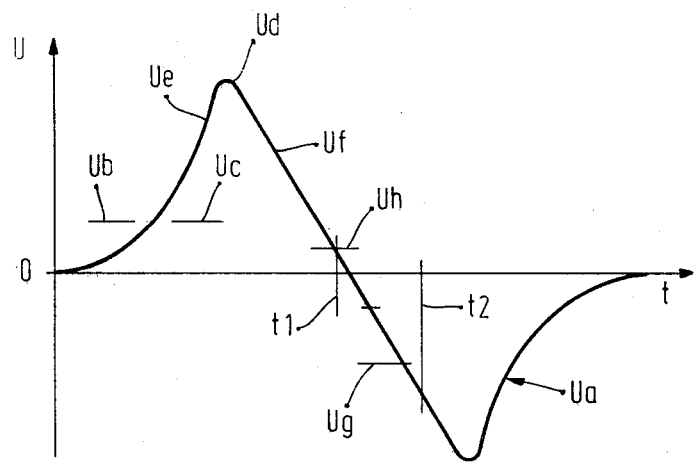

The resistor 28 connected between the output and the noninverting input of the operational amplifier 20 serves to determine the switching hysteresis $U_b - U_g$, while the resistor 29 connected between the inverting input of the operational amplifier 20 and the cathode of the diode 12 determines the position (in voltage range) of the switching hysteresis $U_b - U_g$ in the voltage (U)-time (t) diagram given in FIG. 2.

The a.c. generator 26 is also connected to supply its output to a second threshold switch 30 in such a way that the two threshold switches 19 and 30 have their inputs connected in parallel. The second threshold switch 30 is likewise constituted by an operational amplifier 31 and has its inverting input connected through a resistor 22 to a terminal 25 of the a.c. generator 26 and its noninverting input connected through a resistor 33 to the common connection point of the resistors 22 and 23. The resistor 34 connected between the output and the noninverting input of the operational amplifier 31 determines the switching hysteresis Uc−Uh, while the resistor 35 connected between the inverting input and ground bus 2 determines the position and voltage range of the hysteresis Uc−Uh in the voltage (U) versus time (t) diagram given in FIG. 2.

The output of the operational amplifier 31 is connected through resistor 36 to the base of an npn transistor 37 which also has a connection to the ground 2 through yet another resistor 38. The transistor 37 has its emitter connected to the ground bus 2 and its collector connected through a resistor 39 to the cathode of the diode 12. The collector of the transistor 37 is also connected to the emitter of an npn transistor 40, of which the collector is connected through a resistor 41 to the cathode of the diode 12. The base of the transistor 40 is also connected to the cathode of the diode 42 which serves to improve the switching operation of the transistor 40, before which serves to improve, and through a resistor 43 to the ground bus 2. The anode of the diode 42 is connected through a resistor 44 to the cathode of the protective diode and through a capacitor 45 to the collector of the transistor 37.

The emitter-collector path of the transistor 40 is bridged by a blocking diode 46, of which the anode is connected to the transistor's emitter. Finally, the collector of the transistor 40 is connected to the anode of a diode 47 of which the cathode is connected to ground through the series connection of two resistances 48 and 49. The common connection point of the resistors 48 and 49 is connected to the base of an npn transistor 50, of which the emitter is grounded and the collector is connected over a resistor 51 to the cathode of the protective diode 12. The diode 47 provides for a good switching behavior of the transistor 50, while a diode 52 provided between the collector of the transistor 50 and the base of the transistor 15 has a function of a blocking diode and has its cathode connected to the base of the transistor 16. The circuit components 37, 39, 40, 42, 44, 45 and 50 are principal components of a timing circuit 53 which in this preferred embodiment is constituted in the form of a monostable multivibrator.

The above-described ignition circuit has the following manner of operation:

The alternating voltage signal $U_a$ is shown in FIG. 2, a graph in which voltage (U) is plotted against time (t). In that diagram the switch-on threshold value Ub of the first threshold switch 19 and the switch-on threshold value Uc of the second threshold switch 30 are shown having at least approximately the same magnitude and the same polarity with reference to the null value of the alternating voltage Ua designated by the horizonal axis of the graph. In the illustrated case both of these thresholds have positive polarity. The curve section Ue of the voltage wave which precedes the peak value Ud determines the switch-on time of the threshold switches 19 and 30 and the curve section Uf following the peak value Ud determines the switch-off times of the threshold switches 19 and 30. The switching-off threshold Ug of the first threshold switch 19 should have a polarity, in the illustrated case negative polarity, with reference to the null value of the alternating voltage signal Ua, opposite to the polarity of the switch-on voltage Ub of this threshold switch 19. Furthermore, the switch-off value Uh of the second threshold switch 30 should have the same polarity with reference to the null value of the alternating voltage signal, in the illustrated case positive polarity, as the switch-off threshold value Uc of this threshold switch 30.

If now the alternating voltage signal Ua delivered by the a.c. generator 26 passes through the switch-on threshold Ub of the first threshold switch 19 and the switch-on threshold Uc of the second threshold switch 30, these threshold switches 19 and 30 are switched on, i.e. their outputs supply a voltage that is almost or practically at ground potential. In response thereto the emitter-collector transistor 16 is put into the nonconducting condition and the emitter-collector path of the transistor 8, which is in fact the interruptor 7, is put into the current conducting condition. In consequence, current is caused to flow through the primary winding 5 and ignition energy for the next ignition event is stored in the ignition coil 6.

When the alternating voltage signal Ua drops below the switch-off threshold Uh of the second threshold switch 30, the latter switches off and provides positive potential at its output. The emitter-collector path of the transistor 37 is thereby made conducting and produces a charge condition change of the capacitor 45 through a resistor 44 which limits the charging rate so as to hold the control voltage at the base-emitter path of the transistor 40 at first at such a low level that the corresponding emitter-collector path cannot yet conduct current. In consequency, the emitter-collector path of the transistor 50 still remains conducting and the switching condition of the moment of the transistors 16 and 8 remains undisturbed.

In normal operation of the engine the alternating voltage signal ua finally goes below the switch off threshold Ug of the first threshold switch during the operation phase just described above, so that the positive potential then provided at the output of the threshold switch 19 puts the emitter-collector path of the transistor 16 in the current conducting condition and the emitter-collector path of the transistor 8, which constitutes the interruptor 7, into the nonconducting condition, whereupon the current flowing in the primary winding 5 is interrupted and in the seconary winding 9 a high voltage pulse is produced that sets off an electrical breakdown (ignition spark) in the spark plug.

In the normal case, there then finally arrives the moment t2 shown in FIG. 2 at which the period of the less stable condition of the timing circuit 53 has run out, having begun with the setting of the timing circuit at the moment t1. When the instant t2 arrives, the control voltage on the transistor 40 is sufficient for conduction of the corresponding emitter-collector path and in consequence the emitter-collector path of the transistor 50 is put into nonconducting condition, so that over the resistor 51 and the diode 52 the conducting condition of the emitter-collector path of the transistor 16 and the nonconducting condition of the interruptor 7 can be produced (if they had not been produced already).

In the case in which the engine has "stalled", i.e. has been brought to a stop by an overload, and the alternating voltage Ua still has not reached the switch-off value Ug of the first threshold switch 19, there nevertheless occurs the switchover of the emitter-collector path of the transistor 16 into the conducting condition and thereby the switching off of the interruptor 7 over the previously mentioned connection containing the circuit elements 51 and 52. It is thus thereby assured that when the ignition system is switched on and the engine is not in operation any current flow in the primary winding 5 will be limited in time. Since the unstable period of the monostable circuit 53 extends only over the time lapse between t1 and t2, the capacitor 45 can have a relatively small capacitance and in the design of the ignition system it can be without difficulty integrated into the ignition system as part of an integrated circuit.

Furthermore, when the engine is operating at a very low speed, i.e. when the section of the a.c. voltage signal Ua following the peak value Ub runs very flat, the switching off of the interruptor 7 by the above-described connection containing the components 51 and 52 proceeds without producing a noticable disturbance of ignition timing.

Because the switch-off threshold Ug of the first threshold switch 19 has negative polarity with reference to the null transition of the alternating voltage signal Ua, there is assured, as is actually desired, a relatively small interval between the ignition instant and the instant at which the piston reaches the upper dead point position in the cylinder, at least in the lower speed range.

It is furthermore also possible to set the switch-off threshold Ug of the first threshold switch 19 at such a value that it is made operative by the alternating voltage signal Ua only after the starting of the engine is concluded, which is to say after the operation of putting the engine in motion has been completed. During starting, as already described, the interruptor 7 is brought into the nonconducting condition by means of the second threshold switch 30 operating through the delay circuit 53. In this manner there is obtained in normal operation a relatively large switching hysteresis Ub—Ug and thereby a highly satisfactory desensitization of the ignition system to disturbances, while, on the other hand, in the starting operation the desired retard of the ignition timing can be set by corresponding dimensioning of the delay circuit 53. This makes it unnecessary to indicate to the ignition system by special wire connections that the engine-starting operation is underway.

Although the invention has been described with reference to a particular illustrative example, it will be understood that variations and modifications are possible within the inventive concept.

I claim:

1. Ignition system for an internal combustion engine of the kind utilizing a d.c. voltage source for providing power through an ignition system enabling switch, an engine-driven a.c. generator for providing a timing wave, an ignition coil having a primary and a secondary winding, an electronic interruptor switch in circuit with said primary winding and said d.c. voltage source and means responsive to the timing wave of said a.c. generator for timing the closing and opening of said interruptor switch, said timing means including a first threshold switch responsive to said timing wave of said a.c. generator constituted so as to switch on and to switch off a respective predetermined polarity conditions of said timing wave, said system also having the improvement which comprises:

a second threshold switch (30) responsive to said timing wave of said a.c. generator and having its input in shunt with the input of said first threshold switch, and a delay circuit (53) connected to the output of said second threshold switch and interposed between said second threshold switch and a control circuit for operating interruptor switch which is also responsive to said first threshold switch, said first and second threshold switches being so constituted so that:

in normal operation the switchover of said interruptor switch into its nonconducting condition is produced in response to said first threshold switch (19);

in other cases, the switchover of said interruptor switch into its nonconducting condition is produced in response to said delay circuit (53) prior to a corresponding operation of said first threshold switch, and with reference to the null transition of said a.c. timing wave (U) the switch-on threshold (U) and the switch-off threshold (U) of said first threshold switch (19) are of opposite polarities, whereas the switch-on threshold (U) and the switch-off threshold (U) of said second threshold switch are of the same polarity as that of said switch-on threshold (U) of said first threshold switch (19).

2. Ignition system according to claim 1 in which said delay circuit (53) is constituted as a monostable multivibrator.

3. Ignition system according to claim 1 in which said first threshold switch (19) is so constituted that its said switch-on threshold (U) is reached by said timing wave of said a.c. generator in the starting of the engine from rest only after the operation of starting said engine is completed.

* * * * *